United States Patent
Wright et al.

(10) Patent No.: US 12,418,566 B1
(45) Date of Patent: *Sep. 16, 2025

(54) METHOD OF GENERATING AND USING CREDENTIALS TO DETECT THE SOURCE OF ACCOUNT TAKEOVERS

(71) Applicant: United Services Automobile Association (USAA), San Antonio, TX (US)

(72) Inventors: Jordan Wright, San Antonio, TX (US); William Jennings Woodson, San Antonio, TX (US); Justin Gray, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 8 days.

This patent is subject to a terminal disclaimer.

(21) Appl. No.: 18/346,201

(22) Filed: Jun. 30, 2023

Related U.S. Application Data (63) Continuation of application No. 17/458,152, filed on Aug. 26, 2021, now Pat. No. 11,729,214, which is a
(Continued)

(51) Int. Cl.
*H04L 29/06* (2006.01)
*H04L 9/40* (2022.01)

(52) U.S. Cl.
CPC ...... *H04L 63/1491* (2013.01); *H04L 63/1483* (2013.01)

(58) Field of Classification Search
CPC .. H04L 63/1491; H04L 63/1483; H04L 29/06
See application file for complete search history.

(56) References Cited

U.S. PATENT DOCUMENTS

| 8,544,086 B2 * | 9/2013 | Field | G06F 21/56 |
| | | | 726/5 |
| 8,554,847 B2 * | 10/2013 | Shue | G06Q 10/107 |
| | | | 709/206 |

(Continued)

OTHER PUBLICATIONS

G. Liu, B. Qiu and L. Wenyin, "Automatic Detection of Phishing Target from Phishing Webpage," 2010 20th International Conference on Pattern Recognition, 2010, pp. 4153-4156, doi: 10.1109/ICPR.2010.1010. (Year: 2010).

(Continued)

*Primary Examiner* — Khalid M Almaghayreh
(74) *Attorney, Agent, or Firm* — Perkins Coie LLP (57) ABSTRACT

Disclosed herein are systems and methods that may generate so-called "honey credentials" that are transmitted to a "phishing" website, and are then stored into a honey credential database. The honey credentials appear to be valid credentials, but whenever a bad actor attempts to access an enterprise using the honey credentials, security appliances the enterprise may update the records of the honey credential database to include one or more unique identifiers for each bad actor device that attempts to access the enterprise network using the honey credentials. A server may automatically query the honey credential database to identify other accounts that have been accessed by devices that used the honey credentials to access the enterprise. The server may then flag the accounts and restrict their functionality.

20 Claims, 6 Drawing Sheets

Related U.S. Application Data continuation of application No. 15/789,302, filed on Oct. 20, 2017, now Pat. No. 11,316,895.

(60) Provisional application No. 62/410,606, filed on Oct. 20, 2016.

(56) References Cited

U.S. PATENT DOCUMENTS

| | | | | |
|---|---|---|---|---|
| 8,826,400 | B2* | 9/2014 | Amaya Calvo | H04L 63/0236 713/168 |
| 8,839,369 | B1* | 9/2014 | Dai | G06F 21/552 726/4 |
| 8,880,435 | B1* | 11/2014 | Catlett | G06Q 20/10 705/75 |
| 8,904,506 | B1* | 12/2014 | Canavor | H04L 67/52 713/182 |
| 9,503,451 | B1* | 11/2016 | Kane-Parry | H04L 63/083 |
| 9,769,209 | B1* | 9/2017 | Graham | H04L 63/1433 |
| 10,574,697 | B1* | 2/2020 | McClintock | H04L 63/1491 |
| 11,095,682 | B1* | 8/2021 | Xu | H04L 63/083 |
| 11,316,895 | B1 | 4/2022 | Wright et al. | |
| 2007/0006305 | A1* | 1/2007 | Florencio | H04L 63/1483 726/22 |
| 2007/0039038 | A1* | 2/2007 | Goodman | H04L 63/1483 726/2 |
| 2007/0107053 | A1* | 5/2007 | Shraim | H04L 63/1483 726/22 |
| 2008/0052359 | A1* | 2/2008 | Golan | H04L 63/1483 709/206 |
| 2008/0148377 | A1* | 6/2008 | Kumar | G06F 21/31 726/9 |
| 2009/0216795 | A1* | 8/2009 | Cohen | G06F 21/6218 707/999.102 |
| 2009/0292925 | A1* | 11/2009 | Meisel | H04L 63/0876 713/176 |
| 2011/0126289 | A1* | 5/2011 | Yue | G06F 21/554 726/26 |
| 2011/0296003 | A1* | 12/2011 | McCann | G06F 21/55 709/224 |
| 2012/0290712 | A1* | 11/2012 | Walter | H04L 63/1416 709/224 |
| 2013/0212658 | A1* | 8/2013 | Amaya Calvo | H04L 63/083 726/6 |
| 2014/0041024 | A1* | 2/2014 | Larkins | H04L 63/1483 726/22 |
| 2015/0304347 | A1* | 10/2015 | Smith | H04L 63/0823 726/22 |
| 2016/0057167 | A1* | 2/2016 | Bach | H04L 63/101 726/23 |
| 2016/0156641 | A1* | 6/2016 | Kondapalli | G06F 21/554 726/22 |
| 2017/0048273 | A1* | 2/2017 | Bach | H04L 51/212 |
| 2017/0070483 | A1* | 3/2017 | Sammet | G06F 21/123 |
| 2017/0237753 | A1* | 8/2017 | Manning Dawson | H04L 63/1416 726/23 |
| 2017/0270517 | A1* | 9/2017 | Vasu | G06Q 20/4018 |
| 2018/0007066 | A1* | 1/2018 | Goutal | H04L 63/1483 |
| 2018/0046796 | A1* | 2/2018 | Wright | G06F 21/45 |
| 2018/0048665 | A1* | 2/2018 | Shulman | H04L 63/1425 |
| 2018/0103065 | A1* | 4/2018 | Graham | H04L 63/08 |
| 2018/0205758 | A1* | 7/2018 | Yang | H04L 63/1425 |
| 2020/0293638 | A1* | 9/2020 | Rose | H04L 63/1425 |
| 2021/0234870 | A1* | 7/2021 | Jakobsson | H04L 63/0236 |
| 2022/0094702 | A1* | 3/2022 | Saad Ahmed | H04L 63/1416 |

OTHER PUBLICATIONS

U.S. Appl. No. 17/458,152, filed Aug. 26, 2021, A Method of Generating and Using Credentials to Detect the Source of Account Takeovers.

U.S. Appl. No. 15/789,302 U.S. Pat. No. 11,316,895, filed Oct. 20, 2017 Apr. 26, 2022, A Method of Generating and Using Credentials to Detect the Source of Account Takeovers.

U.S. Appl. No. 62/410,606, filed Oct. 20, 2016, A Method of Generating and Using Credentials to Detect the Source of Account Takeovers.

* cited by examiner

METHOD OF GENERATING AND USING CREDENTIALS TO DETECT THE SOURCE OF ACCOUNT TAKEOVERS

CROSS-REFERENCE TO RELATED APPLICATIONS

This application is a continuation of U.S. patent application Ser. No. 17/458,152 filed Aug. 26, 2021, now allowed, which is a continuation of U.S. patent application Ser. No. 15/789,302 filed Oct. 20, 2017, now U.S. Pat. No. 11,316,895 issued Apr. 26, 2022, which claims priority to U.S. Provisional Patent Application No. 62/410,606 filed Oct. 20, 2016, all of which are hereby incorporated by reference in their entireties for all purposes.

TECHNICAL FIELD

This application generally relates to computer networking and cybersecurity.

BACKGROUND

Enterprise networks that require users to login to access online information, particularly networks of large commercial or governmental entities, frequently face so-called "phishing" schemes orchestrated by bad actors and intended to trick authorized users of the enterprise network to provide valid login credentials to a bad actor. For example, the bad actor might mail phishing emails to any number of authorized user email addresses. An unsuspecting user who clicks on a hyperlink in the phishing email will have their browser taken to a passive webpage that is hosted by the bad actor, and that visually appears to be the actual, valid login webpage of the enterprise. Once at the phishing website, the unsuspecting user will be prompted to enter his or her login credentials (e.g., username and password), among other possible information sought by the bad actor (e.g., credit card, social security number). After the user clicks submit, the credentials and any other entered information is transmitted to the bad actor's webserver that is hosting the webpage. The user's information is stored or transmitted to other bad actors. Then, the bad actor's webpage will redirect the user's browser to the legitimate website of the enterprise. Ordinarily, in this common phishing scenario, the user dismisses the browser redirect as some non-descript, harmless error in the web-technology, and thus proceeds to access the real enterprise network in the normal fashion. Ultimately, the user who was compromised and the enterprise will be unaware of what occurred, as the attacker will be able to rightfully access the enterprise network without triggering any configurations that would otherwise block the incoming traffic or alert administrators of the attacker's access attempt.

To prevent traffic arriving from potential bad actors, conventional security and networking technology may be manually or automatically configured according to so-called "blacklists," "graylists," and/or "whitelists," which contain various identifiers of bad actors, potential bad actors, or good actors. These configuration files allow network appliances of an enterprise network to take certain actions when traffic arrives from a particular identified characteristic note that the browser of the user's computer was redirected from a uniform resource link (URL) associated with bad actors. Conventionally, the security appliances would simply block URLs or other identifiers (e.g., IP addresses, MAC addresses) associated with attackers. However, in such conventional approaches there is no way to identify whether an attack was successful from a different identifier; and there would be no way to link together multiple successful attacks. Enterprise appliances will subscribe to automatically updated "blacklists" or "graylists" of URLs recognized or suspected to be associated with phishing or other fraud schemes. But conventional security approaches ordinarily use these blacklists or graylists to merely block or drop access attempts from such URLs or domains. Oftentimes the threat is too great or the number of the threats is too voluminous for a particular organization to bother expending resources tracking such threats. However, the effect of the blacklists or graylists can be circumvented and the network administrator will not be aware of the successful access attempt, when a bad actor can successfully access the network after executing a successful phishing scheme.

SUMMARY

What is needed is a way to apply the valuable threat intelligence data (e.g., blacklists, graylists)—conventionally employed to prevent access by bad actors—to determine if a bad actor is currently using phished credentials. Moreover, what is also needed is a means of tracking which users are currently being victimized by a phishing scheme, as well as identifying which users were prior victims of phishing and have not learned of the exploitation yet. Disclosed herein are systems and methods capable of addressing the above-described shortcomings and may also provide any number of additional or alternative benefits and advantages. For example, the embodiments described herein may generate so-called "honey credentials" that are transmitted to an attacker server hosting a "phishing" website or application, and are then stored into a honey credential database. To the attacker or any party that receives the honey credentials from the attacker, the honey credentials appear to be valid credentials. But whenever the attacker attempts to access the enterprise, the security appliances or backend servers of the enterprise may update the records of the honey credential database to include one or more unique identifiers for the bad actor devices that attempted to access the enterprise network using the honey credentials. Additionally or alternatively, the backend servers may be configured to present a fake interactive experience for the bad actor, from which any amount of additional information about the bad actor may be collected. Moreover, a server in some embodiments may automatically query the honey credential database to determine which other member-user accounts of the enterprise have been accessed by one or more attacker devices, because the honey credentials allow the enterprise network devices to collect the identifying information via the IP traffic headers and browser information; the query may indicate which other users of the enterprise were phished with this exact phishing campaign.

In an embodiment, a method comprises receiving, by a computer, from a threat intelligence server, an intelligence file containing a plurality of uniform resource locators associated with a plurality of phishing websites respectively; selecting, by the computer, from the intelligence file received from the threat intelligence server, a uniform resource locator associated with a phishing website, in response to a webserver receiving one or more network data packets from a device associated with a user directed from the uniform resource locator; generating, by the computer, a set of fake credentials uniquely associated with the uniform resource locator; transmitting, by the computer, the set of fake credentials to the uniform resource locator associated with the phishing website; and upon the webserver associated with the computer receiving a web session request using the set of fake credentials from an attacker device associated with the uniform resource locator: generating, by the computer, a unique identifier for the attacker device into one or more logging databases, wherein the logging databases are configured to store data associated with one or more devices and their corresponding users and user accounts; updating, by the computer, the user account to reflect the unique identifier for the attacker device; and flagging the a user account corresponding to the user or the device associated with the user, wherein the flagging restricts at least one functionality associated with the user account.

In another embodiment, a computer system comprises a webserver hosting a web site of the enterprise network configured to receive one or more network data packets from one or more devices, and to receive a request for a web session from one or more attacker devices; a honey credential database configured to generate a set of fake credentials uniquely associated with a uniform resource locator of a phishing website in an intelligence file, in response to the webserver receiving the one or more network data packets from a user device associated with a user directed from the uniform resource locator, wherein a server of the system transmits the set of fake credentials to a server hosting the phishing web site having the uniform resource locator, and wherein the honey credential database is configured to store a record of each attacker device that accesses the system using the set of fake credentials; and a security server configured to, upon the webserver receiving the request for the web session from an attacker device associated with the uniform resource locator using the set of fake credentials: generate a unique identifier for the attacker device in the honey credential database and identify in the honey credential database at least one member account that was accessed by the attacker device having the unique identifier, update a user account to reflect the unique identifier for the attacker device; and flag a user account corresponding to the user or the user device, wherein the flagging restricts at least one functionality associated with the user account.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the invention and together with the specification, explain the invention.

DETAILED DESCRIPTION

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

The embodiments described herein provide systems and methods for dynamically generating a set of so-called "honey credentials" that may be distributed to attackers seeking to access enterprise network resources (e.g., enterprise devices) though a phishing scheme. This information may be then tracked to identify when an attacker device attempts to access an account of a member-user associated with the enterprise, and to identify which other member accounts have been accessed using either the honey credentials or using the attacker device. For example, when the system identifies a login attempt by a device using honey credential "username 1" stored in a honey credential database, the system can immediately determine that these honey credentials could only be gathered from the system submitting these credentials to a particular phishing site. During ordinary operation, whenever a device logs into the enterprise network, networking devices and servers execute various scripts that capture device and browser data that can essentially fingerprints the device and/or the device's browser based on various identifiers (e.g., IP address, MAC address, manufacturer-based unique identifier), which allows the enterprise network to identify which devices have accessed the enterprise network and/or enterprise website. So when honey credentials submitted to an attacker are used to access the network by the same or different bad actor, the system can review the access logs and determine which other user accounts the device successfully logged into in the past, on that device. In other words, the system may correlate across multiple users, because if a bad actor has logged into ten accounts, and one of those access attempts uses the honey credentials from the same device, the system can then determine that each of those other access attempts were by a bad actor who phished each of those member-users in that particular phishing campaign.

Traditionally, in honeypot devices or honeypot solutions, fake credentials are just kind of left hanging around a network for an attacker to download after breaching the external security. For example, the system may have a text file accessible for download from the website that a bad actor can "crawl," and then find use those credentials. But, unlike the conventional approach, the embodiments described herein may proactively submit the honey credentials to the attacker server or attacker device that is attempting to collect or phish credentials from member-users. These embodiments may proactively bait an attacker, rather than waiting for an attacker to steal credentials left in a vulnerable location. Moreover, the proactive approach allows the system to generate honey credentials based on the exact URL of an attacker, which allows for a greater degree of granularity in tracking the source of attacks and greater confidence in determining that an attacker or bad actor has sought access to the enterprise network.

Figure 1A:
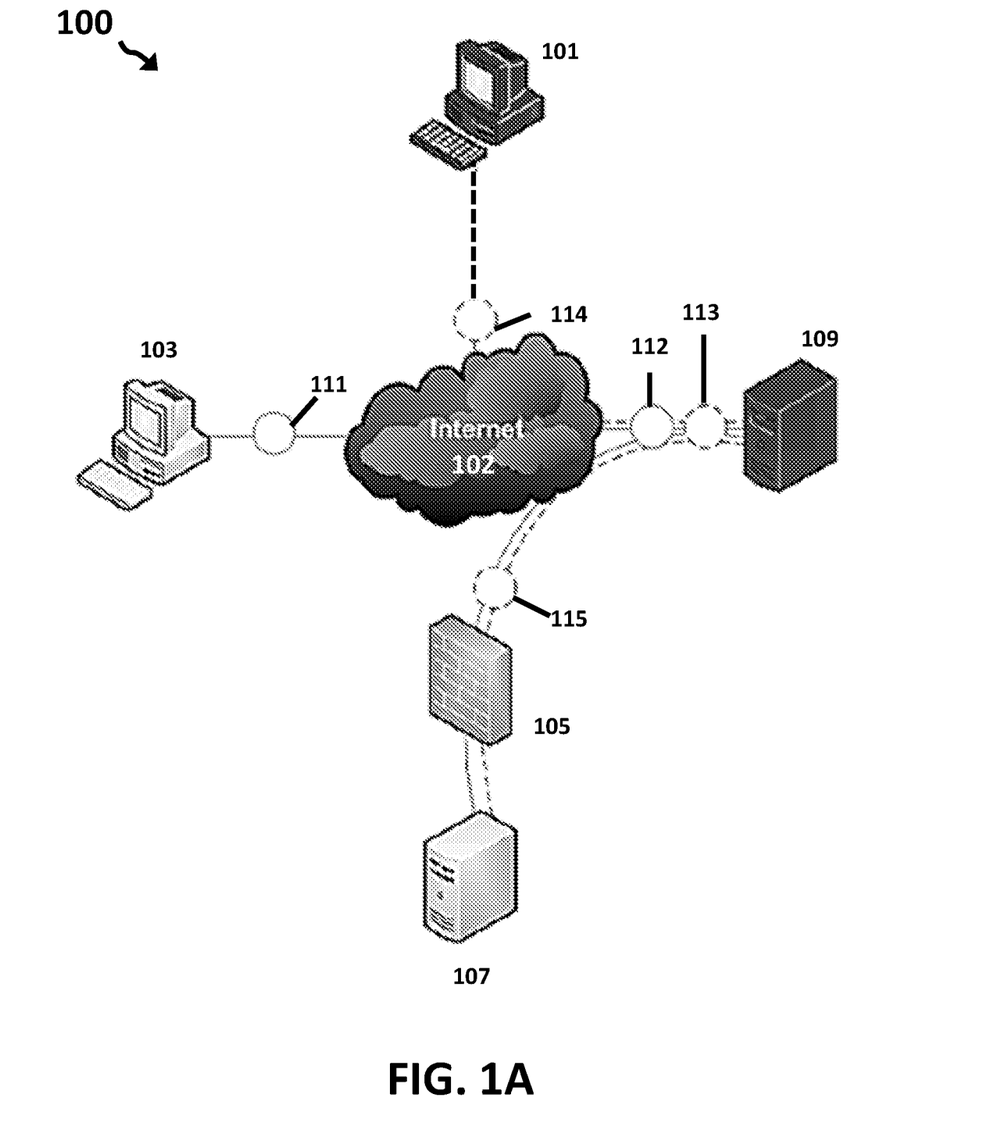
FIG. 1A shows components of an enterprise computing system, according to an embodiment.
Figure 1B:
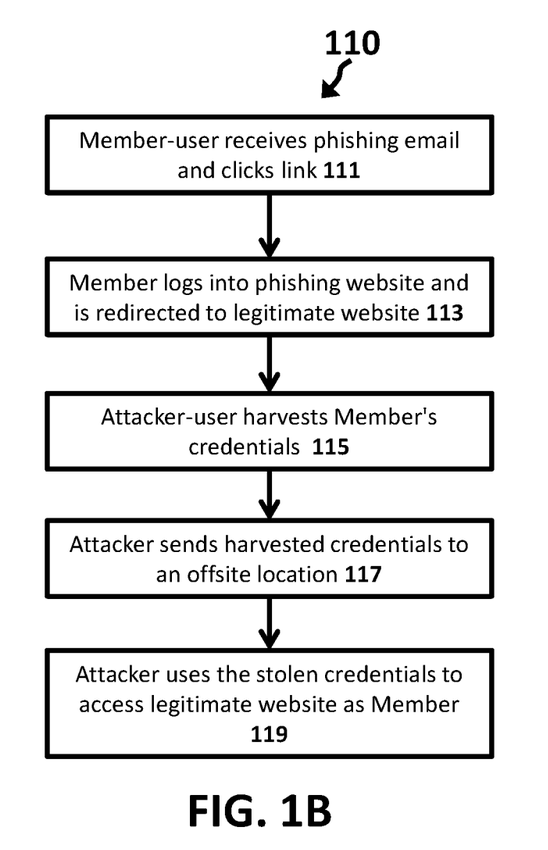
FIG. 1B shows execution of a method by the components of the exemplary system in FIG. 1A.

FIG. 1A shows components of an enterprise computing system 100, according to an embodiment. FIG. 1B shows execution of a method 110 by the components of the system 100, according to the embodiment. As shown in FIG. 1A, the system 100 comprises security appliances 105 and enterprise devices 107 that both undesired attacker devices 101 and acceptable member devices 103 attempt to access via one or more networks, such as the Internet 102. Member devices 103 are associated with authorized users of the enterprise network. Attacker devices 101 are associated with unauthorized users or software programs seeking access to the enterprise devices 107 or attempting to gather private or personal member information, by employing fraudulent schemes (e.g., phishing) intended to gather access credentials or other personal information.

Attacker devices 101 and member devices 103 may include any computing device comprising networking components capable of accessing the various other components of the system 100 (e.g., network interface card) and a processor capable of performing the various tasks or processes described herein. Non-limiting examples of such computing devices may include server computers, desktop computers, laptop computers, tablets, mobile communication devices (e.g., smartphones), and the like.

The system 100 may comprise any number of networks, which may include any combination of private networks (e.g., VPNs, standalone networks) and public networks, which may include the Internet 102. A network may be a shared, public, or private network and may encompass a wide area or a local area; for example, a network may be implemented through a wide area network (WAN), local area network (LAN), an intranet, and/or the Internet 102. A network may be implemented through any combination of wired and/or wireless communication networks. Further, a network may represent multiple networks, such as a wireless carrier network connected to the Internet 102. A network may further comprise hardware and software components configured specifically for data between devices that are internal and external to the enterprise. As shown in FIG. 1A, the enterprise network may comprise internal devices, such as security appliances 105 and enterprise devices 107, logically situated within a logical boundary of the enterprise network; where the logical boundary is established by both TCP/IP standards (e.g., IP addressing) and the security appliances 105 (e.g., firewalls). External devices situated outside the logical boundaries of the enterprise network, such as attacker devices 101, member devices 103, attacker servers 109, and various other computing components of the Internet 102 (e.g., ISP routers), may attempt to access components or software services of the enterprise network via the Internet 102. Networks connecting the devices may include any number of computing and network devices (e.g., routers, switches, servers, firewalls, DNS servers) configured to interconnect computing devices through various networking protocols. As such, one having skill in the art would appreciate that there is no requirement for the networks to include the public Internet 102, and that some embodiments may include entirely internal networking components and devices, such that the attacker devices, 101, member devices 103, and attacker servers 109 are components of the enterprise network.

Security appliances 105 may include any computing or networking device that executes one or more functions intended to logically segment the enterprise network from the Internet 102 and external devices (e.g., attacker devices 101, member devices 103), such as a firewall or encryption device. Additionally or alternatively, security appliances 105 may log security-related events (e.g., login attempts) in one or more event databases (not shown), and/or perform any number of other networking functions that can employed for security purposes as a secondary function (e.g., proxy servers, routers, switches).

An attacker server 109 may be a computing device external to the enterprise network and accessible to the various components of the system 100 over the Internet 102 or other networks. The attacker server 109 may comprise a processor configured to host a website or other application-layer service that receives, stores, and/or transmits data inputs received from the member device 103. The attacker server 109 may comprise non-transitory machine-readable storage medium (e.g., magnetic disk) configured to store member-user credentials and/or other personal information associated with the member-user and received from the member device 103. In operation, the attacker server 109 hosts a phishing application service (e.g., website, FTP site) that a member-user, or pre-programed software routine executed by the member device 103, recognizes as an enterprise application service (e.g., enterprise website) that would ordinarily be hosted by an enterprise device 107 of enterprise network; however, the phishing application service is unaffiliated with the enterprise network. As such, the attacker server 109 may be a computing device configured to execute any number of software applications capable of reproducing (e.g., displaying, executing) an enterprise service and capturing member-user data. For example, the attacker server 109 may execute webserver software (e.g., Apache®, Microsoft IIS®) to host a phishing website accessible to member devices 103 over the Internet 102. In this example, one or more phishing webpages, hosted by the webserver that is executed by the attacker server 109, may be configured to generate and present a graphical user interface (GUI) to a web browser of the member devices 103; the phishing webpages may receive, store, and/or distribute the data captured from each member device 103 when the web browser of the particular member device 103 submits, or "posts," the data to the webserver software of the attacker server 109.

Enterprise devices 107 may include any computing or networking device that is internal to the segmented enterprise network to be protected. Non-limiting examples may include webservers, application servers, databases, internal workstations (e.g., employee desktops), routers, and switches, among others. In the exemplary system 100, an enterprise device 107 is a webserver hosting an enterprise website that requires users to login with credentials, and, in some cases input personal information, to access various business processes hosted by the enterprise website. In this example, the enterprise device 107 may execute webserver software (e.g., Apache®, Microsoft IIS®) to host the enterprise website, such that the enterprise website is accessible to member devices 103 over the Internet 102. The webserver executed by the enterprise device 107 may host one or more enterprise webpages configured to generate and present a GUI to a web browser of the member devices 103; the enterprise webpages may receive, store, and/or process data captured from each member device 103 according to the particular process being executed (e.g., authentication, process transaction) when the web browser of the particular member device 103 submits, or "posts," the data to the webserver software of the enterprise device 107.

As mentioned above, FIG. 1B shows execution of a method 110 by the components of the system 100. The method 110 comprises steps 111, 113, 115, 117, and 119. But one having skill in the art would appreciate that other embodiments may comprise additional or alternative steps, or may omit one or more steps altogether.

In a first step 111, a member-user receives a phishing email containing a hyperlink and "clicks" the hyperlink. The member device 103 is then redirected to a phishing website hosted by an attacker server 109. The phishing website will be a fake of an intended, real website that is hosted by the enterprise network; the phishing website is thus intended to visually resemble the enterprise's website with enough accuracy that at least some members of the actual enterprise are tricked into entering credentials and/or other personal information. In some embodiments, the phishing website includes components (e.g., images) that are linked to the actual website. For example, the phishing website can be directly or indirectly connected to the actual website and copy the "look and feel" of the actual website to trick the users.

In a next step 113, the member accesses phishing website (hosted on an attacker server 109) using the member's confidential login credentials and is then redirected to the legitimate, intended enterprise website. The attacker server 109 then stores the member's real login credentials, or transmits the login credentials to an attacker device 109, as in a next step 115, in which an attacker-user uses the attacker device 101 to harvest the member's credentials from the phishing website hosted by the attacker server 109.

In a next step 117, attacker device 101 or attacker server 109 sends the harvested credentials to an offsite location, or stores the harvested credentials locally on the attacker device 101 or on the attacker server 109. Now, in a next step 119, the attacker uses the attacker device 101 to access the enterprise website or enterprise device 107, but masquerading as the member because the attacker and attacker device 101 have been authenticated by the security appliance 105 using the member's credentials.

Figure 2A:
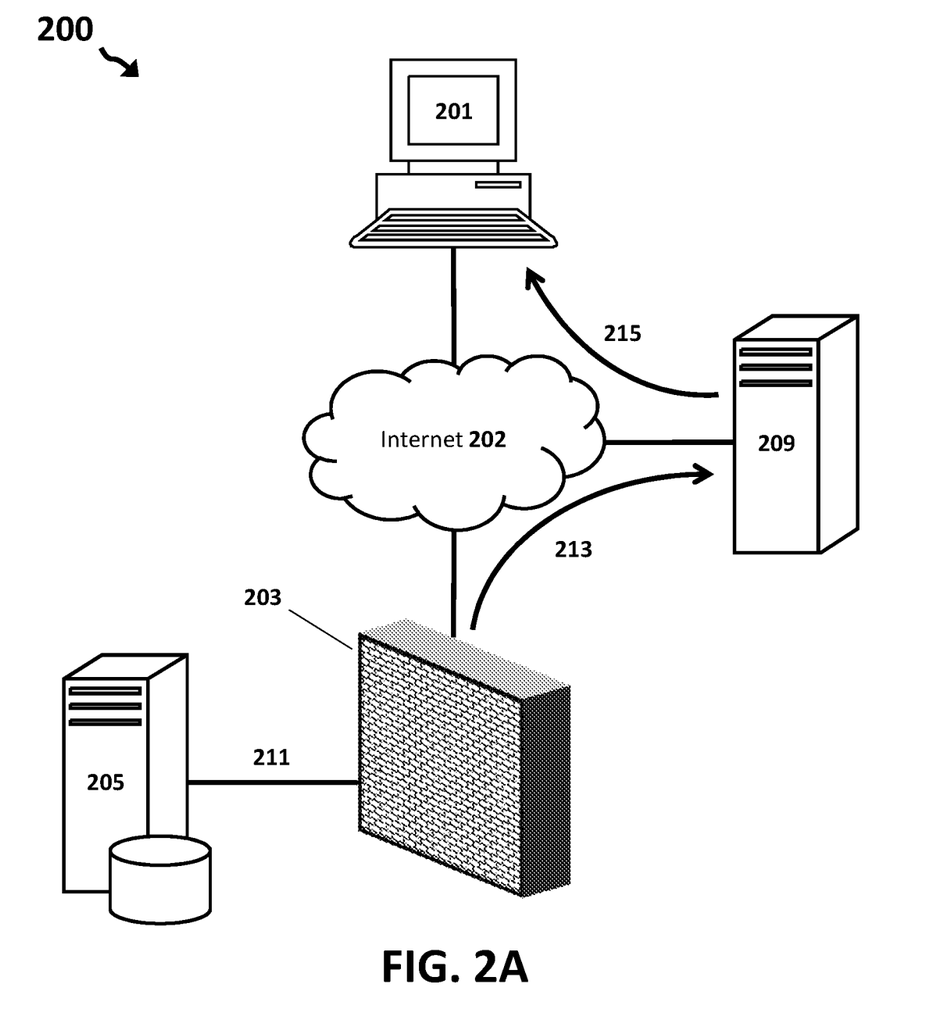
FIG. 2A shows components of an enterprise computing system, according to an embodiment.
Figure 2B:
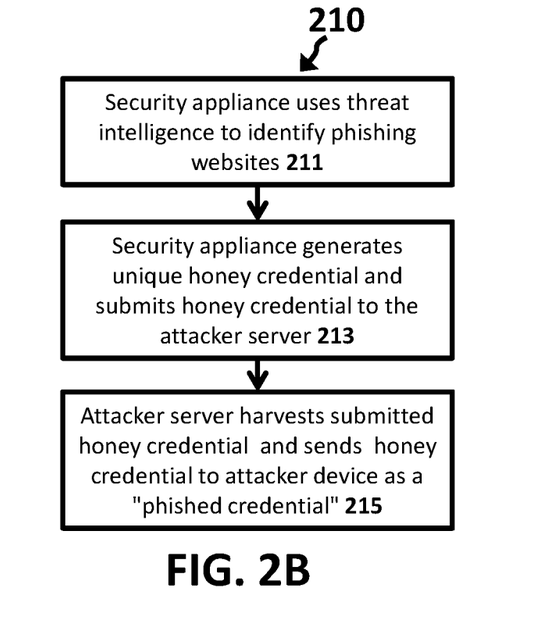
FIG. 2B shows execution of a method by the components of the system in FIG. 2A.

FIG. 2A shows components of an enterprise computing system 200, according to an embodiment. FIG. 2B shows execution of an exemplary method 210 by the components of the system 200, according to the exemplary embodiment. As shown in FIG. 2A, the system 200 comprises security appliances 203 that are connected to internal and/or external threat intelligence servers 205 via one or more networks (not shown). The security appliance 203 is also accessible via one or more networks, such as the Internet 202, to both undesired attacker devices 201 and acceptable member devices (not shown).

Threat intelligence servers 205 may be internal or external computing devices configured to identify, store, and monitor data identifying or otherwise associated with potential attackers. The data collected and stored by the intelligence servers 205 may then be distributed to security appliances 203 or network administrators, to automatically or manually configure the security appliance 203 to identify and/or block data traffic associated with potential attackers. In some implementations, the data received by or from a threat intelligence server 205 may be replicated to any number of security appliances 203, networking devices, databases, and administrator workstations. For example, a security appliance 203 may be a firewall, router, webserver, or proxy server configured to periodically receive a published "blacklist" of problematic URL addresses from a commercial service hosting the threat intelligence server 205. When network traffic from an attacker server 209 is received by, e.g., a firewall or router of the enterprise network, the traffic may be directed to a particular destination, after the firewall or router determines that the traffic originates from an attacker identifier (e.g., device identifier, URL, MAC address, browser identifier) found in a blacklist database or file received from the threat intelligence server 205. Typically, conventional approaches would simply block the incoming traffic at the firewall or router once the traffic has been associated with the attacker identifier on the blacklist. But in this example, the traffic will be directed to one or more security appliances 203 that will gather data about the ongoing attack, such as data associated with the attacker device 201, data associated with the attacker server 209, data associated with the member who was "phished," and/or data associated with the member device, among other types of data.

In the exemplary system 200, a security appliance 203 may be configured to generate a unique set of so-called "honey credentials" that resemble actual member credentials and/or personal information, but are not actually associated with a member. In certain circumstances, discussed further below, the security appliance 203 generates and transmits these honey credentials to an attacker device 201 or attacker server 209. When the honey credentials are used in the future to access the enterprise network, security appliances 203 will identify data about the access event and cross-correlate that data with past events. An example of such an execution is seen in FIG. 2B.

FIG. 2B shows the execution of a method 210 by the components of the system 200. The method 210 comprises steps 211, 213, and 215, though one having ordinary skill in the art will appreciate that other embodiments may comprise additional or alternative steps, or may omit certain steps altogether.

In a first step 211, security appliances 203 use one or more threat intelligence servers 205 to learn about phishing websites hosted by attacker servers 209. In some implementations, the security appliances receive real-time or periodic updates of blacklist or graylist websites, IP addresses, URLs, and/or domains, known or suspected to be associated with phishing schemes. This threat intelligence data may be stored into a threat intelligence database (not shown), which may be database or one or more machine-readable computer files (e.g., text files, spreadsheet files) hosted on a threat intelligence server 205, security appliance 203, or other non-transitory machine-readable storage medium. At least one security appliance 203 may be configured to detect and identify any network traffic directly originating from, or redirected from, a source address (e.g., IP address, URL, domain) listed in the threat intelligence database. Security appliances 203 may also use the threat intelligence server 205 to monitor different users reporting phishing email or other contact purporting to be legitimate. For example, when the user reports corresponding to the same URL satisfied a threshold, the server 205 may tag or flag the URL as a possible phishing website, identify the IP address and/or the domain and store the identified data in the database as a possible phishing website. As described above, the phishing website may also include components (e.g., images or other website component) that are linked to the actual enterprise website. The security appliance 203 and/or the intelligence server 205 may continuously monitor the enterprise website and detect any external linking (e.g., any web site with content that is linked to the enterprise web site), and (upon determining that the externally linked website is a phishing website) add the URL to the list of potential phishing websites in the intelligence database.

In some implementations, the security appliance 203 configured to generate the honey credentials may store a listing of commonly used passwords or password phrases that may be used to generate the fake password and/or username portion of the honey credentials. The security appliance 203 may randomly select one or more words and concatenate the words to generate a unique or semi-unique password or phrase, which may then be stored into a honey credentials database. The honey credentials may then be associated with the attacker device, device and/or browser identifier data, and other such information.

In a next step 215, the attacker server 209 harvests or otherwise captures the honey credential submitted from the security appliance 203 and then sends the honey credential to the attacker device 201 as a "phished credential," unbeknownst to the attacker. When the attacker later attempts to access the enterprise device 207, information about that attacker and attacker device 201 may be captured and stored into various databases, such as credential database and databases utilized by fraud detection devices of the enterprise.

Figure 3A:
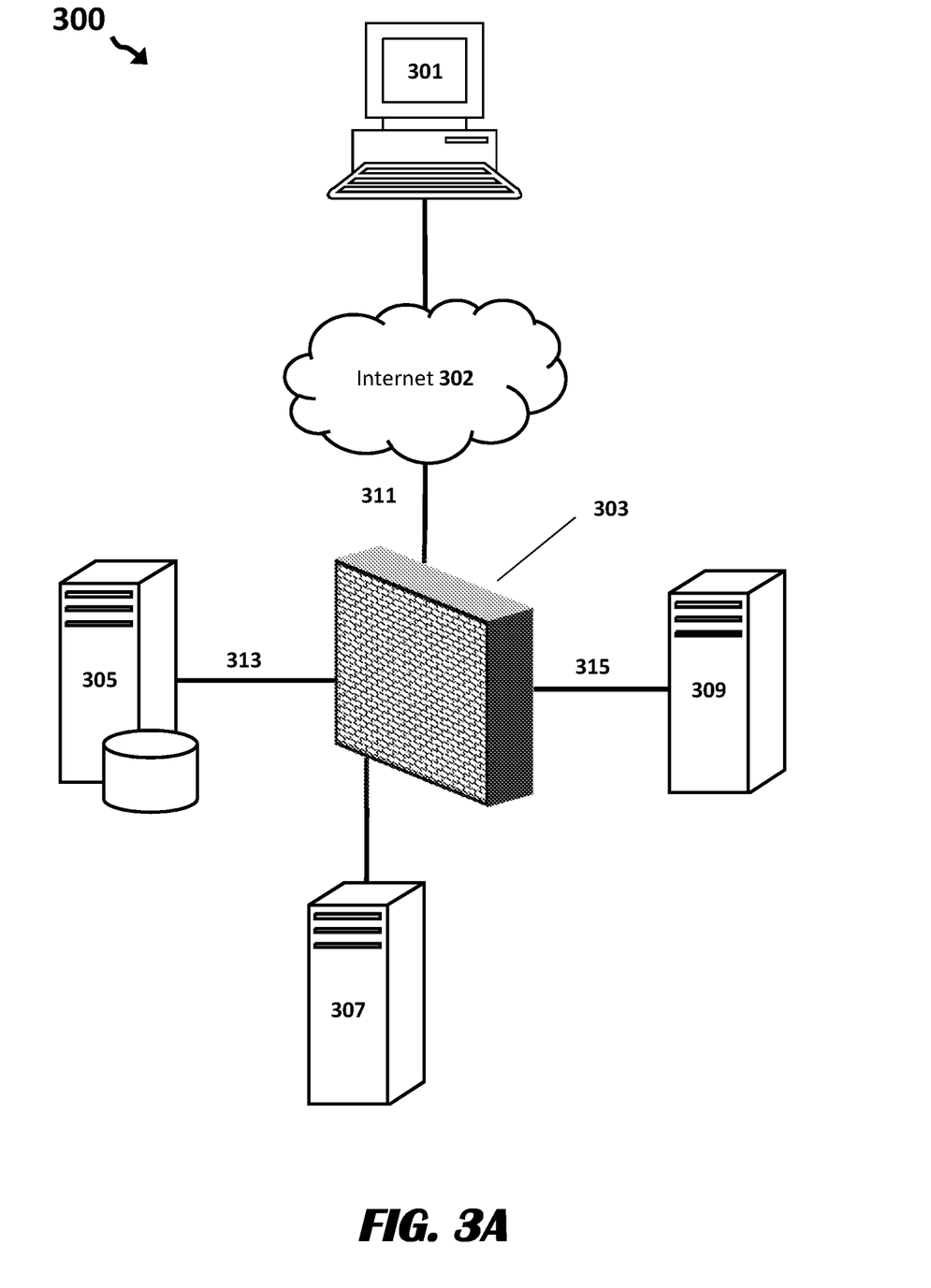
FIG. 3A shows components of an enterprise computing system, according to an exemplary embodiment.
Figure 3B:
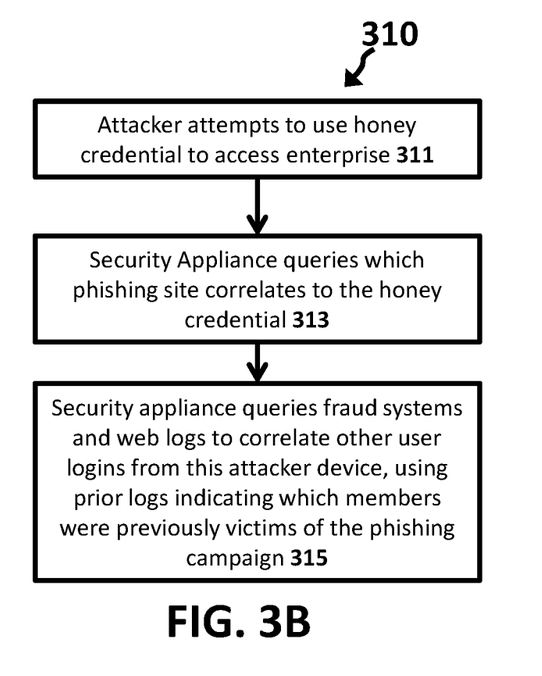
FIG. 3B shows execution of a method by the components of the system in FIG. 3A.

FIG. 3A shows components of an enterprise computing system 300, according to an embodiment. FIG. 3B shows execution of a method 310 by the components of the system 300, according to the embodiment. As shown in FIG. 3A, the system 300 comprises an enterprise network including a credential database 305, security appliances 303, which, in this embodiment may include fraud detection devices 309, and enterprise devices 307. Components of the enterprise network are accessible to attacker devices 301 via one or more networks, such as the Internet 302.

Fraud detection devices 309 may be any internal devices of the enterprise computing network that generate, store, or monitor device data associated with the device behaviors on the enterprise network. Non-limiting examples may include log databases and software that queries the log databases for particular behaviors, according to various models. For the purposes of FIG. 3A, security appliances 303 may be networking or computing hardware and software devices configured to monitor and route data traffic.

In FIG. 3A, fraud detection devices 309 are shown as distinct devices from the security appliances 303 for ease of discussion and illustration. However, it should be appreciated that fraud detection devices 309 may be the same hardware and/or software components as the security appliances 303; or fraud detection devices 309 may be different hardware and/or software components as the security appliances 303.

A credential database 305 may store records of honey credentials generated and distributed by a security appliance 303 (e.g., a server) of the enterprise network. A record of a honey credential will store data about an attacker that will facilitate tracking and cross-correlating past attacks with the attacker. Data fields of a honey credential and/or of an attacker device 301 may include one or more identifiers of an attacker device 301, one or more identifiers of an attacker server (not shown), one or more member identifiers for member accounts attempted to be accessed by the attacker, and/or identifiers of member computers (not shown) associated with or redirected by the attacker device 301 or attacker server, among other types of data fields.

As mentioned, FIG. 3B shows execution of a method 310 by the components of the system 300. The exemplary method 310 comprises steps 311, 313, and 315, though one having ordinary skill in the art will appreciate that other embodiments may comprise additional or alternative steps, or may omit certain steps altogether.

In a first step 311, an attacker attempts to use honey credentials to access one or more enterprise devices 307. And then, in a next step 313, the security appliance 303 queries the credentials database 305 to identify which phishing site correlates to the honey credentials received from the attacker device 301.

In a next step 315, the security appliance 303 queries fraud systems 309 (e.g., web server logs) to identify and correlate other supposed member login attempts from this attacker using the uniquely identifying information from the attacker device 301 and the honey credentials; giving intelligence to which members were victims of the phishing campaign, and which attacker devices 301 have been employed in prior access attempts. In an embodiment, data record associated with a phishing victim may be shared with other databases (not shown), such as a fraud department or a third-party fraud database. Security appliance 303 (or any other server in charge of the operations associated with the phishing victim members) may then flag the member account and start monitoring the member account activity. The security appliance server 303 (upon determining that a member is a phishing victim) may restrict the member's privileges, such as denying any money transfer out of the member account that satisfy a pre-determined threshold, deny any change to the setting and/or the password, or deny any change to the user preferences or information (e.g., contact information). For example, if a user has been determined to be attacked or a phishing victim, the sever 303 may then restrict all transaction that require transfer of money out of the account. The server may further require the user to change the login credential associated with the user account.

In operation, a security appliance 303 or fraud detection system 309 would actually reach out to the honey credential server or the honey credential executable file residing on the attacker device to determine that the attacker device is associated with a particular honey credential, and the security appliance would immediately generate an alert notification and/or alert log entry. The security appliance 303 or fraud detection system 309 may query the various event logs stored in one or more fraud detection systems 309 in order to enrich the alert, by correlating the instant attacker device data with related information from past access attempts, based on matching or similar data. For example, a fraud detection system (e.g., server) may query through any number of web log entries (e.g., database storing Internet traffic data), containing the usernames that were logged in from the particular device (e.g., attacker device 301), to identify which other member usernames, if any, the particular attacker device 301 attempted to access. Moreover, the security appliance 303 and/or fraud detection systems 309 may be dynamically or manually configured to maintain that alert so that any future traffic and/or login attempt from that particular username or particular attacker device 301, is automatically flagged in the web logs. The server may also generate and transmit different notifications (comprising information regarding the affected user and the corresponding user account and user device or the restrictions imposed upon the account) and transmit the notification via an electronic message (e.g., email, text, push notification, and the like). The electronic message may also be sent to a computing system associated with a fraud department. For example, the server may transmit identification of affected users and their account information to a fraud department for further screening and attention.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
receiving, by at least one computer system associated with an enterprise website, phishing reports associated with a plurality of uniform resource locators associated with a plurality of phishing websites, wherein the phishing reports are from multiple users;
in response to a number of the phishing reports associated with at least one uniform resource locator of the plurality of uniform resource locators satisfying a threshold,
  selecting, by the at least one computer system, a user account to associate with a set of fake credentials, wherein the user account is associated with at least one of the phishing reports associated with the at least one uniform resource locator;
  identifying one or more components of the at least one uniform resource locator that are linked to the enterprise website;
  after selecting the user account, generating, by the at least one computer system, the set of fake credentials that resemble information associated with the user account of a user;
  transmitting, by the at least one computer system, the set of fake credentials to the at least one uniform resource locator; and
  in response to receiving, from at least one device, a web session request to access the user account using the set of fake credentials,
    flagging the user account associated the set of fake credentials, wherein the set of fake credentials are configured to be provided for the web session request, and
    correlating the at least one device with the one or more components of the at least one uniform resource locator.

2. The method of claim 1, further comprising:
transmitting, by the at least one computer system, an electronic message to a fraud computing system, wherein the electronic message comprises identification of the user of the user account, a device associated with the user, or a unique identifier associated with the at least one device.

3. The method of claim 1, further comprising:
querying one or more logging databases to determine other user accounts that have been accessed by the at least one device.

4. The method of claim 1, further comprising:
generating threat data associated with phishing threats based on detecting one or more websites having at least one component linked to a component of a website associated with the at least one computer system.

5. The method of claim 1, further comprising:
generating, by the at least one computer system, a unique identifier for the at least one device.

6. The method of claim 1, further comprising:
generating, by the at least one computer system, threat data based on one or more users reposting phishing emails.

7. The method of claim 1, wherein flagging the user account restricts changing login credentials associated with the user account.

8. A system comprising:
one or more processors; and
one or more memories storing instructions that, when executed by the one or more processors, cause the system to perform a process comprising:
receiving, by at least one computer system associated with an enterprise website, phishing reports associated with a plurality of uniform resource locators associated with a plurality of phishing websites, wherein the phishing reports are from multiple users;
in response to a number of the phishing reports associated with at least one uniform resource locator of the plurality of uniform resource locators satisfying a threshold,
selecting, by the at least one computer system, a user account to associate with a set of fake credentials, wherein the user account is associated with at least one of the phishing reports associated with the at least one uniform resource locator;
identifying one or more components of the at least one uniform resource locator that are linked to the enterprise website;
after selecting the user account, generating, by the at least one computer system, the set of fake credentials that resemble information associated with the user account of a user;
transmitting, by the at least one computer system, the set of fake credentials to the at least one uniform resource locator; and
in response to receiving, from at least one device, a web session request to access the user account using the set of fake credentials,
flagging the user account associated the set of fake credentials, wherein the set of fake credentials are configured to be provided for the web session request, and
correlating the at least one device with the one or more components of the at least one uniform resource locator.

9. The system according to claim 8, wherein the process further comprises:
transmitting, by the at least one computer system, an electronic message to a fraud computing system, wherein the electronic message comprises identification of the user of the user account, a device associated with the user, or a unique identifier associated with the at least one device.

10. The system according to claim 8, wherein the process further comprises:
querying one or more logging databases to determine other user accounts that have been accessed by the at least one device.

11. The system according to claim 8, wherein the process further comprises:
generating threat data associated with phishing threats based on detecting one or more websites having at least one component linked to a component of a website associated with the at least one computer system.

12. The system according to claim 8, wherein the process further comprises:
generating, by the at least one computer system, a unique identifier for the at least one device.

13. The system according to claim 8, wherein the process further comprises:
generating, by the at least one computer system, threat data based on one or more users reposting phishing emails.

14. The system according to claim 8, wherein flagging the user account restricts changing login credentials associated with the user account.

15. A non-transitory computer-readable medium storing instructions that, when executed by a computing system, cause the computing system to perform operations comprising:
receiving, by at least one computer system associated with an enterprise website, phishing reports associated with a plurality of uniform resource locators associated with a plurality of phishing websites, wherein the phishing reports are from multiple users;
in response to a number of the phishing reports associated with at least one uniform resource locator of the plurality of uniform resource locators satisfying a threshold,
selecting, by the at least one computer system, a user account to associate with a set of fake credentials, wherein the user account is associated with at least one of the phishing reports associated with the at least one uniform resource locator;
identifying one or more components of the at least one uniform resource locator that are linked to the enterprise website;
after selecting the user account, generating, by the at least one computer system, the set of fake credentials that resemble information associated with the user account of a user;
transmitting, by the at least one computer system, the set of fake credentials to the at least one uniform resource locator; and
in response to receiving, from at least one device, a web session request to access the user account using the set of fake credentials,
flagging the user account associated the set of fake credentials, wherein the set of fake credentials are configured to be provided for the web session request, and
correlating the at least one device with the one or more components of the at least one uniform resource locator.

16. The non-transitory computer-readable medium of claim 15, wherein the operations further comprise:
transmitting, by the at least one computer system, an electronic message to a fraud computing system, wherein the electronic message comprises identification of the user of the user account, a device associated with the user, or a unique identifier associated with the at least one device.

17. The non-transitory computer-readable medium of claim 15, wherein the operations further comprise:
querying one or more logging databases to determine other user accounts that have been accessed by the at least one device.

18. The non-transitory computer-readable medium of claim 15, wherein the operations further comprise:
generating threat data associated with phishing threats based on detecting one or more websites having at least one component linked to a component of a website associated with the at least one computer system.

19. The non-transitory computer-readable medium of claim 15, wherein the operations further comprise:
generating, by the at least one computer system, a unique identifier for the at least one device.

20. The non-transitory computer-readable medium of claim 15, wherein the operations further comprise:
    generating, by the at least one computer system, threat data based on one or more users reposting phishing emails.

\* \* \* \* \*